United States Patent
Lv

(10) Patent No.: US 11,876,644 B2
(45) Date of Patent: Jan. 16, 2024

(54) HIGH-EFFICIENCY TRANSMISSION ETHERNET DEVICE

(71) Applicant: Motorcomm Electronic Technology Co., Ltd., Jiangsu (CN)

(72) Inventor: Wenhui Lv, Jiangsu (CN)

(73) Assignee: Motorcomm Electronic Technology Co., Ltd., Suzhou (CN)

( * ) Notice: Subject to any disclaimer, the term of this patent is extended or adjusted under 35 U.S.C. 154(b) by 0 days.

(21) Appl. No.: 17/985,520

(22) Filed: Nov. 11, 2022

(65) Prior Publication Data

US 2023/0396465 A1  Dec. 7, 2023

(30) Foreign Application Priority Data

Jun. 1, 2022  (CN) .......................... 202210618516.7

(51) Int. Cl.
  *H04L 69/22* (2022.01)
  *H04L 12/46* (2006.01)
(52) U.S. Cl.
  CPC .......... *H04L 12/4633* (2013.01); *H04L 69/22* (2013.01); *H04L 2212/00* (2013.01)
(58) Field of Classification Search
  None
  See application file for complete search history.

(56) References Cited

U.S. PATENT DOCUMENTS

| | | | | |
|---|---|---|---|---|
| 2016/0099862 A1* | 4/2016 | Stellick | ............... | H04L 41/0663 709/223 |
| 2017/0257151 A1* | 9/2017 | Lange | ..................... | H04W 4/06 |
| 2021/0409339 A1* | 12/2021 | Calciu | ................. | H04L 41/0813 |
| 2022/0060569 A1* | 2/2022 | Wang | ..................... | H04L 69/22 |

FOREIGN PATENT DOCUMENTS

| CN | 109842868 A | 6/2019 |
|---|---|---|
| CN | 112738846 A | 4/2021 |

* cited by examiner

*Primary Examiner* — James A Edwards
(74) *Attorney, Agent, or Firm* — Ryan Dean; Umberg Zipser LLP

(57) ABSTRACT

The invention discloses a high-efficiency transmission Ethernet device comprising, a data transmitting module, wherein when receiving a data packet sent by an upper-layer device, and judging that other Ethernet devices in the same local area network for data transmission support a small packet aggregation function, the data transmitting module is configured to aggregately encapsulate all small packets contained in the data packet to form at least one aggregated Ethernet frame and to send it to other corresponding Ethernet devices; and a data receiving module, wherein when receiving data frames sent by other Ethernet devices in the same local area network supporting the small packet aggregation function, performing data parsing on the data frames when judging that the received data frames are routine Ethernet frames, and performing data parsing on the data frames when judging the data frames are aggregated Ethernet frames.

7 Claims, 4 Drawing Sheets

HIGH-EFFICIENCY TRANSMISSION ETHERNET DEVICE

BACKGROUND OF THE INVENTION

1. Field of the Invention

The invention relates to the technical field of communication devices, and more particularly, to a high-efficiency transmission Ethernet device.

2. Description of the Related Art

Ethernet is a communication protocol standard that is by far the most commonly used in local area network (LAN) and it was developed in the earlier 1970s. Ethernet is a commonly used LAN standard transmitting data with a transmitting speed at Generally, an Ethernet device consists of a shared transmission medium, for example, a twisted-pair cable or a coaxial cable, a multiport hub, a bridge or a switch. In a star or bus configuration, the hub/switch/bridge connects computers, printers and workstations to each other with a cable.

After the Ethernet device is started, transmission with other Ethernet devices can be roughly divided into two stages. As shown in FIG. 1, the first stage is an Ethernet device discovery process. After startup, the Ethernet device sends its main capabilities, such as the management address, device identity and interface identity, to the other Ethernet devices connected to the same local area network through LLDP (Link layer Discovery protocol). In the meantime, the Ethernet device obtains information corresponding to the other devices in the same local area network. In the second stage, the Ethernet device sends, according to capabilities of Ethernet devices at the peer, Ethernet packets (Ethernet frames) that the Ethernet devices at the peer can process, based on the information obtained in the first stage, thereby enabling communication among different Ethernet devices.

When transmitting data over Ethernet, Ethernet data packets used in this process are called Ethernet frames. A format of each of the Ethernet frame is shown in FIG. 2. it can be seen that the one Ethernet frame comprises a preamble, a start frame delimiter, data, a redundancy check and an interframe gap. The preamble is 7 bytes long with a default value of 7 bytes of 0x55; the start frame delimiter is 1 byte long with a default value of 0x5D; data comprises the Ethernet frame control field (having a length of 18 bytes) and an upper-layer payload data with a variable length; the redundancy check is 4 bytes long; and the interframe gap is at least 12 bytes long. The MTU (Maximum Transmission Unit) for an Ethernet is typically 1500 bytes, that is, an Ethernet data frame can be up to 1500 bytes.

In conclusion, an Ethernet data frame contains two types of data, some data is fixed overhead of some control fields; the other is an upper-layer payload data carried. The length of the upper-layer payload data is variable, while the fixed overhead of the control fields is relatively fixed, and each Ethernet frame requires a fixed overhead of at least 42 bytes. In practice, however, a large amount of short (about 100 bytes) upper-layer application data may be generated in most applications, such as data packets of voice calls, data packets of online games, and so on. If an upper-layer payload data is 100 bytes, each Ethernet frame is 142 bytes long, and the transmission efficiency is about 70.4%, relatively low.

SUMMARY OF THE INVENTION

Given that the foregoing problems exist in the prior art, the present invention provides a high-efficiency transmission Ethernet device, comprising:

a data transmitting module, wherein when receiving a data packet sent by an upper-layer device, and judging that other Ethernet devices in the same local area network for data transmission support a small packet aggregation function, the data transmitting module is configured to aggregately encapsulate all small packets contained in the data packet to form at least one aggregated Ethernet frame and to send it to other corresponding Ethernet devices; and a data receiving module, wherein when receiving data frames sent by other Ethernet devices in the same local area network supporting the small packet aggregation function, performing data parsing on the data frames according to a pre-configured conventional parsing rule when judging that the received data frames are routine Ethernet frames, and performing data parsing on the data frames according to a pre-configured aggregation parsing rule when judging the data frames are the aggregated Ethernet frames.

Preferably, the Ethernet device further comprises a data acquisition module, wherein the data acquisition module is connected to the data transmitting module and the data receiving module, respectively, and is configured to send a broadcast about its own device information to the local area network each time when the device is powered on, and configured to acquire the device information of other Ethernet devices in the local area network, the device information comprises parameters indicating whether it supports the small packet aggregation function;

wherein the data transmitting module and the data receiving module determine whether the other Ethernet devices for data transmission support the small packet aggregation function based on the device information.

Preferably, the data acquisition module through a Link Layer Discovery Protocol broadcasts its own device information to the local area network where the device is located.

Preferably, the data packet comprises a plurality of payload packets arranged in sequence;

the data transmitting module comprises:

a first judging unit, configured to output a first signal if it is judged that the other Ethernet devices for data transmission do not support the small packet aggregation function, and configured to output a second signal if it is judged that the other Ethernet devices support the small packet aggregation function;

a first sending unit, connected to the first judging unit, and configured to encapsulate each of the plurality of payload packets to form the routine Ethernet frames based on the first signal and send them to the other Ethernet devices in sequence;

a second sending unit, connected to the first judging unit, and configured to routinely encapsulate the plurality of payload packets which are large packets to form the routine Ethernet frames based on the second signal, configured to aggregately encapsulate the plurality of payload packets which are continuous small packets to form the aggregated Ethernet frames, and configured to send them sequentially to the other Ethernet devices according to an order they are arranged in the data packet.

Preferably, the second sending unit comprises:
a comparison subunit, configured to obtain a data length of each of the plurality of payload packets based on the second signal, and configured to configure the payload packets having the data length greater than a preset threshold as the large packets and configure the payload packets having the data length not greater than the threshold as the small packets;
a first encapsulation subunit, connected to the comparison subunit, and configured to encapsulate the plurality of payload packets which are large packets to form the routine Ethernet frames;
a second encapsulation subunit, connected to the comparison subunit, and configured to aggregate all of the continuous small packets and add a fragment header before each of the payload packets until the aggregated data length reaches a preset maximum transmission length or aggregation of all the continuous small packets is completed, then encapsulate the payload packets to form the aggregated Ethernet frames;
a sending subunit, connected to the first encapsulation subunit and the second encapsulation subunit, respectively, and configured to sequentially send the routine Ethernet frames and the aggregated Ethernet frames to the other Ethernet devices according to the sequence of the plurality of payload packets in the data packet before they are encapsulated.

Preferably, the data receiving module comprises:
a second judging unit, configured to output a third signal if it is judged that the other Ethernet devices sending the data frames support the small packet aggregation function, and configured to output a fourth signal if it is judged that the other Ethernet devices do not support the small packet aggregation function;
a first receiving unit, connected to the second judging unit, and configured to perform data parsing on the received data frames according to the routine parsing rule, based on the third signal; and
a second receiving unit, connected to the second judging unit, configured to perform data parsing on the data frames according to the routine parsing rule if it is judged based on the fourth signal that frame types of the data frames are the routine Ethernet frames, and configured to perform data parsing on the data frames according to the aggregation parsing rule if it is judged based on the fourth signal that the frame types of the data frames are the aggregated Ethernet frames.

Preferably, a frame structure of the routine Ethernet frames comprises a preamble, a start frame delimiter, the payload packets, a redundancy check and an interframe gap in sequence;
a frame structure of the aggregated Ethernet frames comprises the preamble, the start frame delimiter, at least two of the aggregated data, the redundancy check and the interframe gap in sequence, and each aggregated data comprises the fragment header and the payload packet.

Preferably, the start frame delimiter of the routine Ethernet frames and the start frame delimiter of the aggregated Ethernet frames have different values, and the second receiving unit determines the frame types of the data frames according to the start frame delimiter.

By adopting the above-mentioned technical solutions, the present invention has the following advantages or beneficial effects: the Ethernet device is configured to have the small packet aggregation function, so that a plurality of small payload packets can be aggregately encapsulated to form an Ethernet frame during the process of transmission of the Ethernet small payload packets. In this way, the transmission rate at which the Ethernet transmits the small payload packets can be effectively improved, and the compatibility with old equipment and the Ethernet device that does not support the small packet aggregation function is guaranteed.

DETAILED DESCRIPTION

The present invention will be described hereinafter with reference to the accompanying drawings and particular embodiments, but the invention is not limited thereto. Other implementations are contemplated as long as they are consistent with the subject of the invention.

Figure 3:
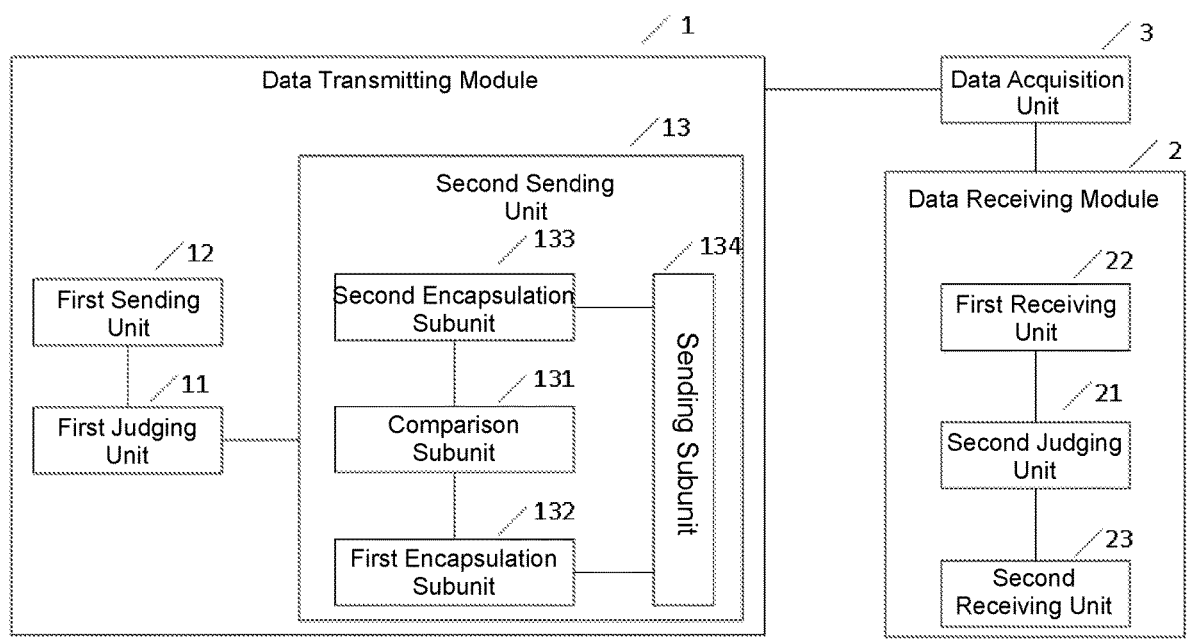
FIG. 3 is a schematic diagram showing a structure of a high-efficiency transmission Ethernet device in a preferred embodiment of the present invention.

In a preferred embodiment of the invention, given that the foregoing problems exist in the prior art, the present invention provides a high-efficiency transmission Ethernet device, as shown in FIG. 3, comprising:
a data transmitting module 1, wherein when receiving a data packet sent by an upper-layer device, and judging that other Ethernet devices in the same local area network for data transmission support a small packet aggregation function, the data transmitting module 1 is configured to aggregately encapsulate all small packets contained in the data packet to form at least one aggregated Ethernet frame and to send it to other corresponding Ethernet devices; and
a data receiving module 2, wherein when receiving data frames sent by other Ethernet devices in the same local area network supporting the small packet aggregation function, performing data parsing on the data frames according to a pre-configured routine parsing rule when judging that the received data frames are routine Ethernet frames, and performing data parsing on the data frames according to a pre-configured aggregation parsing rule when judging the data frames are aggregated Ethernet frames.

Figure 4:
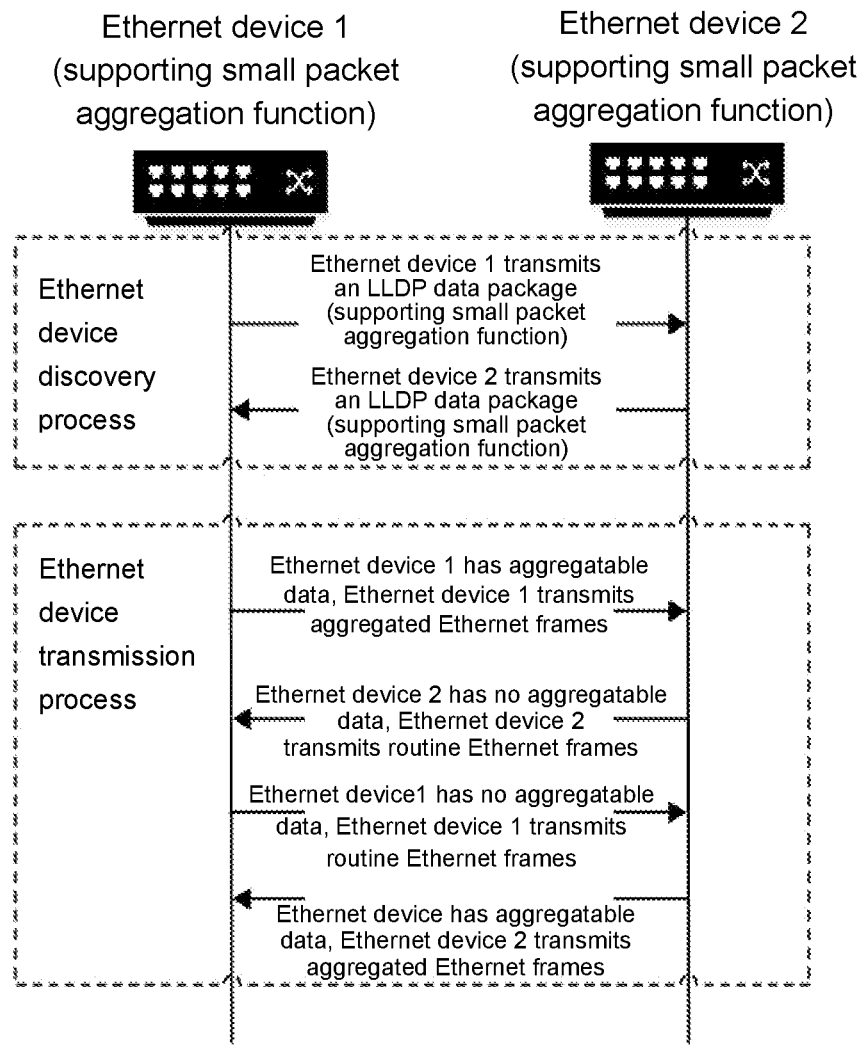
FIG. 4 is a schematic diagram showing a process of mutual communication between two Ethernet devices supporting a small packet aggregation function in a preferred embodiment of the present invention.
Figure 5:
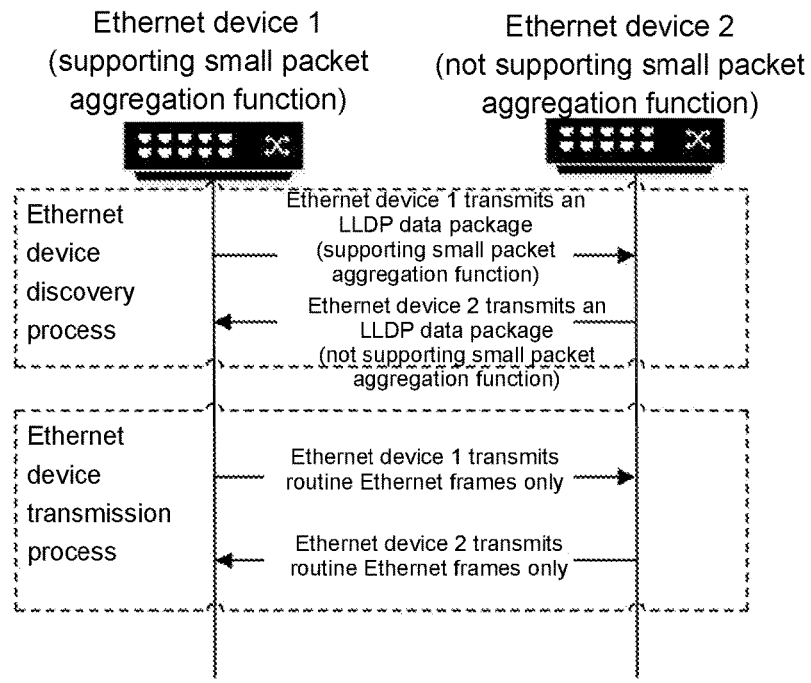
FIG. 5 is a schematic diagram showing a process of mutual communication between Ethernet devices supporting a small packet aggregation function and Ethernet devices not supporting the small packet aggregation function in a preferred embodiment of the present invention.

In particular, the high-efficiency transmission Ethernet device disclosed in this technical solution also comprises two stages, as shown in FIGS. 4 and 5, wherein the first stage is an Ethernet device discovery process:
in a preferred embodiment of the invention, the Ethernet device further comprises a data acquisition module 3, wherein the data acquisition module is connected to the data transmitting module 1 and the data receiving module 2, respectively, and is configured to send a broadcast about its own device information to the local area network each time when the device is powered on, and configured to acquire the device information of other Ethernet devices in the local area network, the device information comprises parameters indicating whether it supports the small packet aggregation function;

wherein the data transmitting module 1 and the data receiving module 2 determine whether the other Ethernet devices for data transmission support the small packet aggregation function based on the device information.

In a preferred embodiment of the invention, the data acquisition module 3 through a Link Layer Discovery Protocol broadcasts its own device information to the local area network where the device is located. In this embodiment, the device information broadcast by the Ethernet device is configured with parameters indicating whether it supports the small packet aggregation function, each Ethernet device can obtain information indicating whether the activated Ethernet devices support the small packet aggregation function through the device information broadcast in the local area network, then an adaptive communication can be established depending on different capabilities of different Ethernet devices. Forms of the above-mentioned parameters are not limited, and it is only necessary to be negotiated to reach a consensus in the local area network.

A second stage is an Ethernet device transmission process, which further comprises a data transmitting process and a data receiving process:

wherein the data transmitting process is to forward the data package sent by the upper-layer device to other Ethernet devices in the same local area network, wherein in a preferred embodiment, the data packet sent by the upper-layer device comprises a plurality of payload packets arranged in sequence;

the data transmitting module 1 comprises:

a first judging unit 11, configured to output a first signal if it is judged that the other Ethernet devices for data transmission do not support the small packet aggregation function, and configured to output a second signal if it is judged that the other Ethernet devices support the small packet aggregation function;

a first sending unit 12, connected to the first judging unit 11, and configured to encapsulate each of the plurality of payload packets to form the routine Ethernet frames based on the first signal and send them to the other Ethernet devices in sequence;

a second sending unit 13, connected to the first judging unit 11, and configured to routinely encapsulate the plurality of payload packets which are large packets to form the routine Ethernet frames based on the second signal, configured to aggregately encapsulate the plurality of payload packets which are continuous small packets to form the aggregated Ethernet frames, and configured to send them sequentially to the other Ethernet devices according to an order they are arranged in the data packet.

In particular, considering that the same local area network may contain both Ethernet devices supporting the small packet aggregation function and Ethernet devices not supporting the small packet aggregation function, in the case of the Ethernet devices not supporting the small packet aggregation function, if aggregated Ethernet frames are sent to such Ethernet devices, data parsing may fail. In this regard, in order to ensure the compatibility of the devices, in the embodiment, the data packet is transmitted in the form of the routine Ethernet frames for the Ethernet devices not supporting the small packet aggregation function, while the aggregation encapsulation function of the small payload packets are enabled for the Ethernet devices supporting the small packet aggregation function, to maximize the transmission efficiency of the small payload packets.

Furthermore, the second sending unit 13 comprises:

a comparison subunit 131, configured to obtain a data length of each of the plurality of payload packets based on the second signal, and configured to configure the payload packets having the data length greater than a preset threshold as the large packets and configure the payload packets having the data length not greater than the threshold as the small packets;

a first encapsulation subunit 132, connected to the comparison subunit 131, and configured to encapsulate the plurality of payload packets which are large packets to form the routine Ethernet frames;

a second encapsulation subunit 133, connected to the comparison subunit 131, and configured to aggregate all of the continuous small continuous packets and add a fragment header before each of the payload packets until the aggregated data length reaches a preset maximum transmission length or aggregation of all the continuous small packets is completed, then encapsulate the payload packets to form the aggregated Ethernet frames;

a sending subunit 134, connected to the first encapsulation subunit 132 and the second encapsulation subunit 133, respectively, and configured to sequentially send the routine Ethernet frames and the aggregated Ethernet frames to the other Ethernet devices according to the sequence of the plurality of payload packets in the data packet before they are encapsulated.

In particular, in this embodiment, the data packet sent by the upper-layer device at one time comprises 10 payload packets arranged in sequence, for example. The first payload packet is a large packet, and the second to sixth payload packets are small packets, the seventh load packet is a large packet, and the eighth to ninth payload packets are small packets. In the meantime, the first payload packet forms a first routine Ethernet frame, and the second payload packet to the sixth payload packet are aggregately encapsulated. For the sake of easy explanation, it is assumed that the data length of each small packet is the same, if the aggregated data length of four small packets reaches a preset maximum transmission length, only the second to fifth payload packets can be aggregately encapsulated to form the first aggregated Ethernet frame. Although the sixth payload packet is a small packet, but the seventh payload packet is a large packet, the sixth payload packet then is individually encapsulated to form a second routine Ethernet frame, the seventh payload packet is encapsulated to form a third routine Ethernet frame, the eighth payload packet to the ninth payload packet can be encapsulated to form a second aggregated Ethernet frame, then the first routine Ethernet frame, the first aggregated Ethernet frame, the second routine Ethernet frame, and the third routine Ethernet frame and the second aggregated Ethernet frame are sent to other Ethernet devices in this sequence, meaning transmission of the data packet is completed.

Similarly, in the above-mentioned process, if the data length of three aggregated small packets reaches the preset maximum transmission length, the second payload packet to the fourth payload packet can be aggregately encapsulated to form the first aggregated Ethernet frame, the fifth payload packet and the sixth payload packet are aggregately encapsulated to form the second aggregated Ethernet frame, the seventh payload packet is encapsulated to form the third routine Ethernet frame, and the eighth payload packet to the ninth payload packet can be encapsulated to form the third aggregated Ethernet frame, then the first routine Ethernet frame, the first aggregated Ethernet frame, the second aggregated Ethernet frame, the second routine Ethernet frame, and the third aggregated Ethernet frame are sent to other Ethernet devices in this sequence, meaning transmission of the data packet is completed.

Wherein the above-mentioned data receiving process is a process of receiving data frames sent by the other Ethernet devices. In particular, in a preferred embodiment of the present invention, the data receiving module 2 comprises:

a second judging unit 21, configured to output a third signal if it is judged that the other Ethernet devices sending the data frames support the small packet aggregation function, and configured to output a fourth signal if it is judged that the other Ethernet devices do not support the small packet aggregation function;

a first receiving unit 22, connected to the second judging unit 21, and configured to perform data parsing on the received data frames according to the routine parsing rule, based on the third signal; and a second receiving unit 23, connected to the second judging unit 22, configured to perform data parsing on the data frames according to the routine parsing rule if it is judged based on the fourth signal that frame types of the data frames are the routine Ethernet frames, and configured to perform data parsing on the data frames according to the aggregation parsing rule if it is judged based on the fourth signal that the frame types of the data frames are the aggregated Ethernet frames.

In particular, since different types of Ethernet data frames have different encapsulation structures, corresponding data parsing rules are also different. In this embodiment, upon receipt of data frames sent by other Ethernet devices, first determining whether the other Ethernet devices, sending the data frames, support the small packet aggregation function, if not, it means that it can only send the routine Ethernet frames, and data parsing can be done for the received data frames simply by directly invoking routine parsing rules. If the other Ethernet devices sending data support the small packet aggregation function, it can be seen from the data transmission process that they may send the routine Ethernet frames or the aggregated Ethernet frames. Therefore, it is necessary to identify the frame types before performing parsing to determine to use the routine parsing rule or the aggregated parsing rule for parsing based on the identification result that the frame types are the routine Ethernet frames or the aggregated Ethernet frames.

Figure 1:
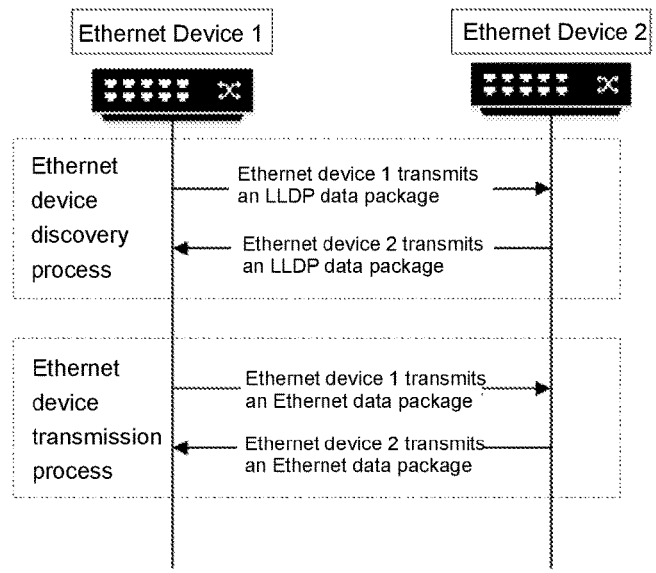
FIG. 1 is a schematic diagram showing a process of mutual communication among existing Ethernet devices.
Figure 2:
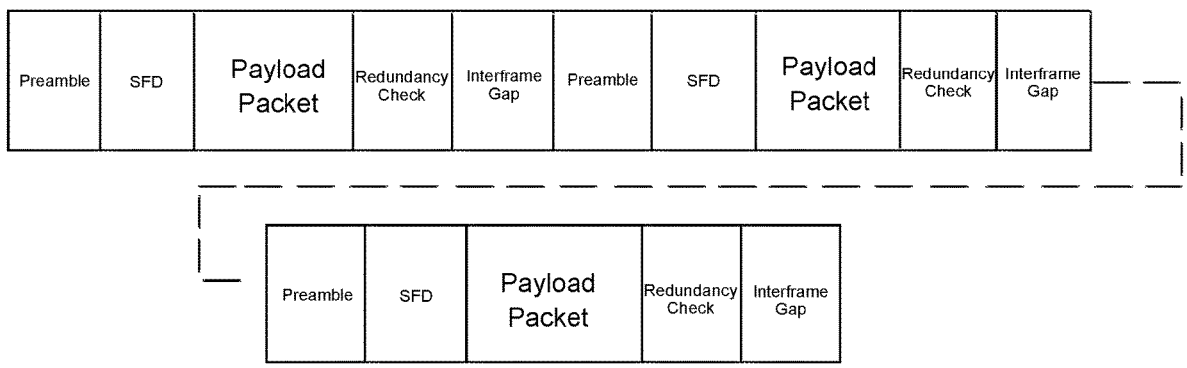
FIG. 2 is a frame structure of a routine Ethernet frame.
Figure 6:
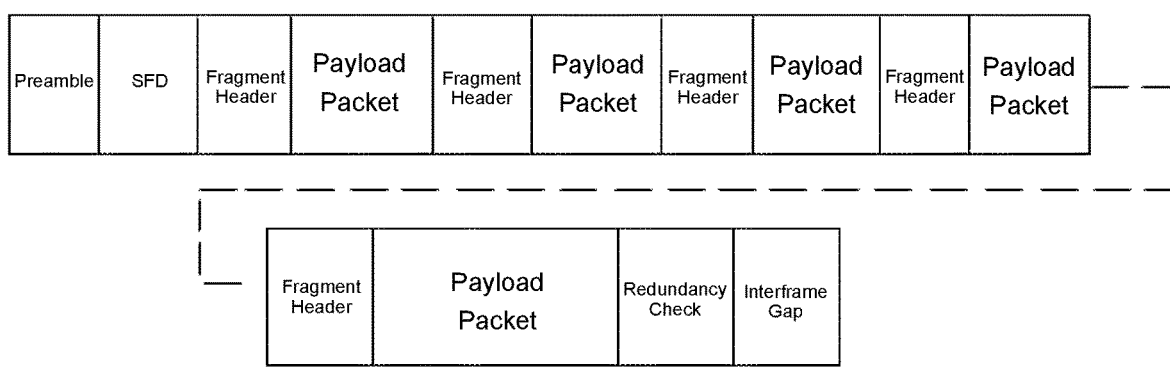
FIG. 6 is a frame structure of an aggregated Ethernet frame in a preferred embodiment of the present invention.

In a preferred embodiment of the invention, as shown in FIG. 2, a frame structure of the routine Ethernet frames comprises a preamble, a start frame delimiter, the payload packets, a redundancy check and an interframe gap in sequence;

as shown in FIG. 6, a frame structure of the aggregated Ethernet frames comprises the preamble, the start frame delimiter, at least two of the payload packets, the redundancy check and the interframe gap in sequence, and each aggregated data comprises the fragment header and the payload packet.

In a preferred embodiment of the invention, the start frame delimiter of the routine Ethernet frames and the start frame delimiter of the aggregated Ethernet frames have different values, and the second receiving unit determines the frame types of the data frames according to the start frame delimiter.

In particular, in this embodiment, definitions of the preamble, the redundancy check and the interframe gap of the routine Ethernet frame and the aggregated Ethernet frame are the same with the exception that a value of the start frame delimiter of the routine Ethernet frame is generally 0x5D, the value of the start frame delimiter of the aggregated Ethernet frame can be configured to be different from 0x5D, including but not limited to 0x5F.

Wherein the fragment header is preferably 2 bytes long, and controls the length of the payload packets of the fragment and whether the payload packet is the payload packet of the last fragment.

As a preferred embodiment, it is assumed that continuous small load packets are present, and the data length of each small load packet is 100 bytes, and the maximum transmission length is 1500 bytes, when a high-efficiency transmission Ethernet device of the present invention is used, an aggregated Ethernet frame can transmit 1452 bytes of data, and the specific calculation formula is as follows:

$$8(\text{preamble})+(100(\text{payload packet})+2(\text{fragment header}))*14+4(\text{redundancy check})+12(\text{interframe gap})=1452$$

that is, an aggregated Ethernet frame can transmit 14 small load packets of 100 bytes, and its transmission efficiency is 1400/1452*100%=96.4%.

However, in the prior art, 1736 bytes are required to transmit 14 payload packets of 100 bytes, and the calculation formula is as follows:

$$(8(\text{preamble})+100(\text{payload packet})+4(\text{redundancy check})+12(\text{interframe gap}))*14=1736$$

Its transmission efficiency is 1400/1736*100=80.6%.

In conclusion, it can be seen from this embodiment that the transmission efficiency of the present invention is increased by nearly 16%. Therefore, the Ethernet device of the present invention can significantly increase the Ethernet transmission efficiency of the small payload packets, and the smaller the payload packet, the higher the transmission efficiency.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A high-efficiency transmission Ethernet device comprises:

a data transmitting module, wherein when receiving a data packet sent by an upper-layer device, and judging that other Ethernet devices in the same local area network for data transmission support a small packet aggregation function, the data transmitting module is configured to aggregately encapsulate all small packets contained in the data packet to form at least one aggregated Ethernet frame and to send it to other corresponding Ethernet devices; and a data receiving module, wherein when receiving data frames sent by other Ethernet devices in the same local area network supporting the small packet aggregation function, performing data parsing on the data frames according to a pre-configured routine parsing rule when judging that the received data frames are routine Ethernet frames, and performing data parsing on the data frames according to a pre-configured aggregation parsing rule when judging the data frames are aggregated Ethernet frames;

wherein the data packet comprises a plurality of payload packets arranged in sequence, and wherein the data transmitting module comprises:

a first judging unit, configured to output a first signal if it is judged that the other Ethernet devices for data transmission do not support the small packet aggregation function, and configured to output a second signal if it is judged that the other Ethernet devices support the small packet aggregation function;

a first sending unit, connected to the first judging unit, and configured to encapsulate each of the plurality of payload packets to form the routine Ethernet frames based on the first signal and send them to the other Ethernet devices in sequence;

a second sending unit, connected to the first judging unit, and configured to routinely encapsulate the plurality of payload packets which are large packets to form the routine Ethernet frames based on the second signal, configured to aggregately encapsulate the plurality of payload packets which are continuous small packets to form the aggregated Ethernet frames, and configured to send them sequentially to the other Ethernet devices according to an order they are arranged in the data packet.

2. The Ethernet device of claim 1, further comprising a data acquisition module, wherein the data acquisition module is connected to the data transmitting module and the data receiving module, respectively, and is configured to send a broadcast about its own device information to the local area network each time when the device is powered on, and configured to acquire the device information of other Ethernet devices in the local area network, the device information comprises parameters indicating whether it supports the small packet aggregation function;

wherein the data transmitting module and the data rec module determine whether the other Ethernet devices for data transmission support the small packet aggregation function based on the device information.

3. The Ethernet device of claim 2, wherein the data acquisition module through a Link Layer Discovery Protocol broadcasts its own device information to the local area network where the device is located.

4. The Ethernet device of claim 1, wherein the second sending unit comprises:

a comparison subunit, configured to obtain a data length of each of the plurality of payload packets based on the second signal, and configured to configure the payload packets having the data length greater than a preset threshold as the large packets and configure the payload packets having the data length not greater than the threshold as the small packets;

a first encapsulation subunit, connected to the comparison subunit, and configured to encapsulate the plurality of payload packets which are large packets to form the routine Ethernet frames;

a second encapsulation subunit, connected to the comparison subunit, and configured to aggregate all of the continuous small packets and add a fragment header before each of the payload packets until an aggregated data length reaches a preset maximum transmission length or aggregation of all the continuous small packets is completed, then encapsulate the payload packets to form the aggregated Ethernet frame;

a sending subunit, connected to the first encapsulation subunit and the second encapsulation subunit, respectively, and configured to sequentially send the routine Ethernet frames and the aggregated Ethernet frames to the other Ethernet devices according to the sequence of the plurality of payload packets in the data packet before they are encapsulated.

5. The Ethernet device of claim 4, wherein the data receiving module comprises:

a second judging unit, configured to output a third signal if it is judged that the other Ethernet devices sending the data frames support the small packet aggregation function, and configured to output a fourth signal if it is judged that the other Ethernet devices do not support the small packet aggregation function;

a first receiving unit, connected to the second judging unit, and configured to perform data parsing on the received data frames according to the routine parsing rule, based on the third signal; and a second receiving unit, connected to the second judging unit, configured to perform data parsing on the data frames according to the routine parsing rule if it is judged based on the fourth signal that frame types of the data frames are the routine Ethernet frames, and configured to perform data parsing on the data frames according to the aggregation parsing rule if it is judged based on the fourth signal that the frame types of the data frames are the aggregated Ethernet frames.

6. The Ethernet device of claim 5, wherein a frame structure of the routine Ethernet frames comprises a preamble, a start frame delimiter, the payload packets, a redundancy check and an interframe gap in sequence;

a frame structure of the aggregated Ethernet frames comprises the preamble, the start frame delimiter, at least two of the aggregated data, the redundancy check and the interframe gap in sequence, and each aggregated data comprises the fragment header and the payload packet.

7. The Ethernet device of claim 6, wherein the start frame delimiter of the routine Ethernet frames and the start frame delimiter of the aggregated Ethernet frames have different values, and the second receiving unit determines the frame types of the data frames according to the start frame delimiter.

* * * * *